United States Patent [19]

Brandolino

[11] Patent Number: 5,319,875
[45] Date of Patent: Jun. 14, 1994

[54] CAGE LURE

[76] Inventor: Giuseppe Brandolino, 36 Karen Court, Brampton, Ontario, Canada, L6Y 4J1

[21] Appl. No.: 32,572

[22] Filed: Mar. 17, 1993

[51] Int. Cl.$^5$ ............................................. A01K 85/00
[52] U.S. Cl. ....................................... 43/42.06; 43/41; 43/44.99
[58] Field of Search ............... 43/42.06, 44.2, 44.4, 43/41, 41.2, 44.99, 42.22, 42.35, 42.31, 44.8

[56] References Cited

U.S. PATENT DOCUMENTS

| | | | |
|---|---|---|---|
| 2,008,004 | 7/1935 | Catarau | 43/42.06 |
| 2,709,317 | 5/1955 | Pease | 43/42.06 |
| 2,765,575 | 10/1956 | Gfroerer | 43/44.99 |
| 2,844,907 | 7/1958 | Merton | 43/44.99 |
| 2,974,436 | 3/1961 | Gourlay | 43/44.4 |
| 3,047,976 | 8/1962 | Gourlay | 43/44.4 |
| 4,205,476 | 6/1980 | Hsu | 43/42.35 |
| 4,426,804 | 1/1984 | Hutson | 43/44.91 |
| 4,471,558 | 9/1984 | Garcia | 43/44.4 |

FOREIGN PATENT DOCUMENTS

| | | | |
|---|---|---|---|
| 0552126 | 4/1923 | France | 43/41 |
| 0024679 | of 1907 | United Kingdom | 43/41 |

*Primary Examiner*—Paula A. Bradley
*Assistant Examiner*—James Miner
*Attorney, Agent, or Firm*—Bereskin & Parr

[57] ABSTRACT

A cage lure for attachment to a fishing hook and a fishing line, and for containing bait is disclosed. The cage lure comprises a bait enclosure bag having a flexible meshed construction; a dual spring closure means for closing the open end of the bait enclosure bag; a leader having openable attachment rings, the rings adapted for attachment, in use, to the fishing line and the fishing hook; and means for releasably attaching the bait enclosure bag to the leader, the attachment means comprising at least two loops.

6 Claims, 5 Drawing Sheets

CAGE LURE

FIELD OF THE INVENTION

The present invention relates to a fishing lure for use with bait and the like.

BACKGROUND OF THE INVENTION

Up until now, when an angler desires to use live bait, it has been necessary to impale the bait on a hook. Conventionally, it has been believed that the bait should be mounted directly on the hook. This has numerous disadvantages. For instance, by forcing the hook through the bait, the bait is thereby injured and will die relatively quickly. Once dead, the bait in incapable of independent movement and will not exhibit the distress signals that attract fish. Forcing a hook through the bait also weakens the tissue of the bait which makes the bait susceptible to falling off the hook; having no bait on the hook will greatly lower the chances of catching fish.

Traditionally, emphasis was placed on bait that was visually attractive to the desired type of fish. It is now recognized that the scent and also the distress signals given off by small animals or insects are used by fish to locate food sources, and hence can be used to attract fish to a baited hook. Thus, the roe of certain fish gives off a scent that will attract other predator fish. It is also becoming increasingly common for fishing supply stores to stock a wide variety of pellets, which contain various scents intended to attract different fish. Sometimes these are sold in liquid form, and are used to saturate a sponge pellet. In either case, the bait is relatively expensive and difficult to retain on a conventional hook.

If an animal or insect is impaled on a hook, frequently it will die quite quickly. If it can be retained alive then it will continue to emit distress signals, e.g. vibrations of various frequencies which may or may not be audible to the human ear, and these can attract appropriate game fish.

When frogs are used as bait, the usual method of hooking the frog is to force the hook through the upper and lower jaws of the frog. Often, novice fishermen hook the frog through its nasal cavity, which hastens the death of the frog greatly, leading more quickly to the disadvantages stated above.

Also, the standard hook lure is not suitable for certain types of bait, such as crickets, grasshoppers and other insects, due to the softness and fragility of the tissue of the bait.

It is therefore desirable to provide a fishing lure in which the bait is securely retained, and which improves the attractiveness of the bait to the fish.

It is further desirable to provide a fishing lure in which live bait remains alive and intact for a lengthy period.

SUMMARY OF THE INVENTION

The inventor of this invention has realised that it is not necessary to mount the bait directly on the hook, but rather, it is sufficient if the bait is simply located closely adjacent the hook.

According to the present invention, there is provided a cage lure for attachment to a fishing hook and a fishing line, and for use in containing bait, comprising:

(a) a bait enclosure bag having a flexible meshed construction sufficiently perforate to enable water to pass therethrough and to contact the bait, said bait enclosure bag having a closed end and an open end opposite said closed end;

(b) a closure means for closing said open end, said closure means comprising a dual spring which is biased into a closed position, but which can be resiliently deflected to an open position;

(c) a leader having openable attachment rings, said rings adapted for attachment, in use, to the fishing line and the fishing hook; and (d) means for releasably attaching said bait enclosure bag to said leader, said attachment means comprising at least two loops.

BRIEF DESCRIPTION OF THE DRAWINGS

For a better understanding of the present invention and to show more clearly how it may be carried into effect, reference will now be made to the accompanying drawings which show the preferred embodiments of the present invention and in which.

DESCRIPTION OF THE PREFERRED EMBODIMENTS

Figure 1:
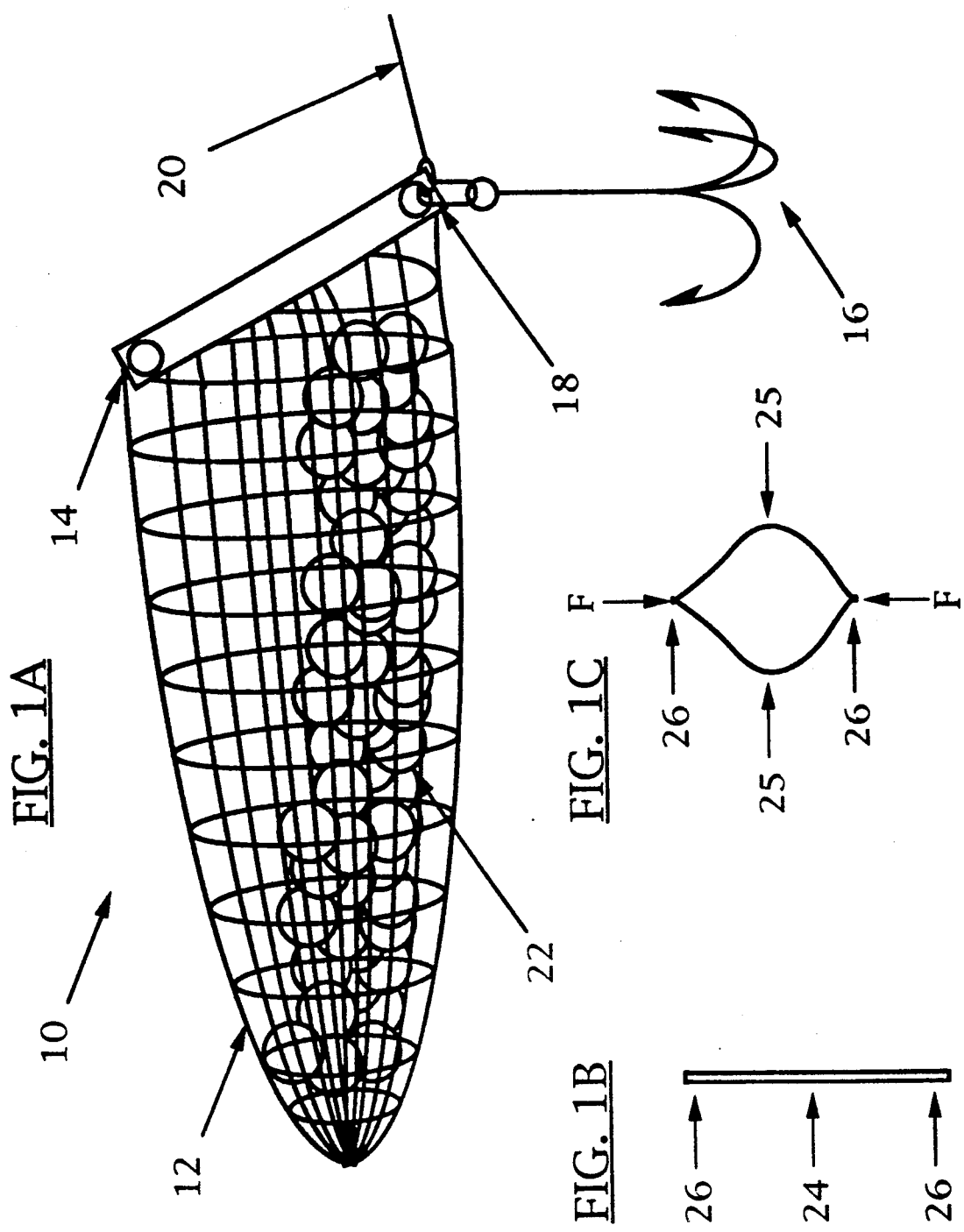
FIG. 1A is a side view of a cage lure according to the present invention.
FIG. 1B is an end view of the spring of the embodiment of FIG. 1A in a closed position.
FIG. 1C is an end view of the spring of the embodiment of FIG. 1A in an open position.

FIG. 1A shows a cage lure 10 which comprises a meshed bag 12, which is closed at one end and open at the other, and a spring 14. The meshed bag 12 is preferably constructed of strong nylon wire, but any material that is suitable for extended immersion in water can be used. The mesh of bag 12 is sufficiently small to ensure that bait 22 is retained in the cavity of the bag 12.

The spring 14 is of the "dual" type; that is, it resembles flat, elongate spring plates 25 mounted face to face and secured together at their ends. The spring 14 has a slit 24 along the longitudinal axis of the spring 14, with end portions 26 at each end of the spring 14 joining spring plates 25 together as is shown in FIG. 1B. The plates 25 could be integral with one another, i.e. a single spring strip folded in half or moulded in one piece. The spring 14 is preferably of a suitable type of plastic; however, spring steel or any other material which is sufficiently resilient to allow the spring 14 to be compressed repeatedly, as will be described below, could be used. The meshed bag 12 is preferably fused to the spring 14, if the respective materials so allow; otherwise the bag 12 is attached to the spring 14 in any manner that will provide for a firm seal between the meshed bag 12 and the spring 14, for example by using glue or other sealants, or by tying individual strands of the mesh to the spring 14.

Instead of spring 14, the bag 12 could be provided with a drawstring, which can close the opening at the end of the bag. The drawstring can be held in a closed position by friction, for example.

In the embodiment shown in FIG. 1A, a circular aperture 18 is provided transversely through the spring 14. The aperture 18 provides a place for attachment of a fishing line 20 to the lure 10. In the embodiment shown in FIG. 1A, the lure 10 has one treble hook 16, which is also attached to the lure 10 through aperture 18. It is to be understood that the hook 16 could be attached at any point on lure 10 which will provide for a sufficiently strong connection between hook 16 and lure 10 such that hook 16 may not be pulled loose from lure 10 by a fish. It is also to be understood that there may be multiple hooks attached at various places to a single lure.

The lure 10 shown in FIG. 1A is used as follows. By gripping opposite ends of the spring 14 and applying a force F at each of the two end portions 26, the spring 14 is compressed to an open position, which is shown in FIG. 1C, and then bait 22 can be placed within the cavity of bag 12. (For this purpose, the plates 25 should both curve outwards slightly, so that they will tend to deflect as shown under influence of the force F.) The force F necessary to open the spring 14 is then removed, and the spring 14 resumes the unstressed position shown in FIG. 1B. The lure 10 is then ready for use. The bait 22 depicted in FIG. 1A is roe; however, it will be appreciated that any type of bait can be placed within the cavity of bag 12, such as scented pellets, live bait, etc.

Figure 2:
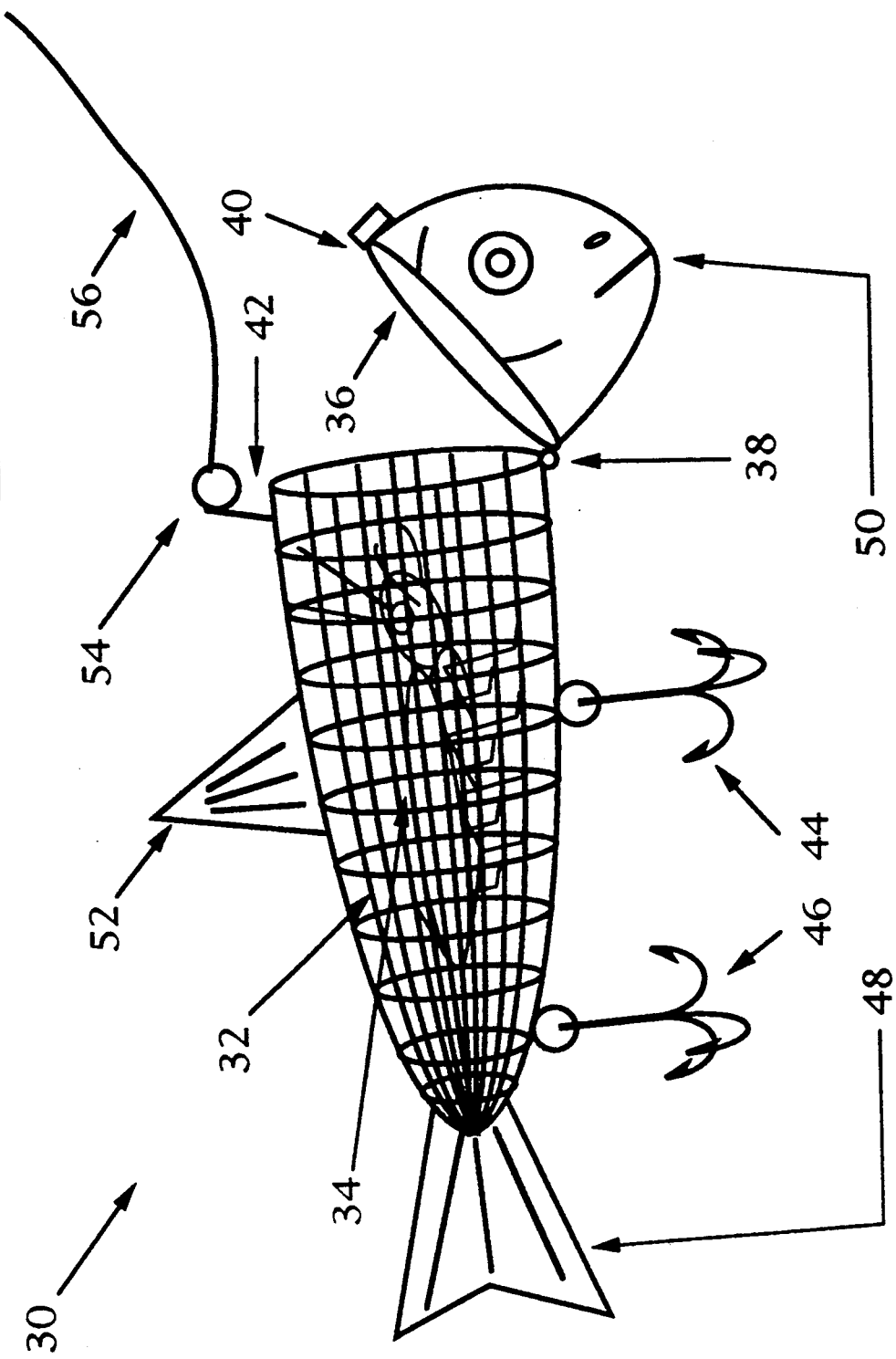
FIG. 2 is a side view of a second embodiment of a cage lure according to the present invention.

FIG. 2 shows a lure 30 which has a rigid wire or mesh body 32. Body 32 is closed at one end and open at the other. A lid 36 is connected to the open end of body 32 by a hinge 38 and is held in place against the body 32 by the interaction of two complementary latching portions 40 and 42. It will be appreciated that lid 36 may be connected to the open end of body 32 by any suitable means; for example, lid 36 could act as a plug that snaps into place or lid 36 could be screwed into body 32.

In the embodiment shown in FIG. 2, two treble hooks 44, 46 are attached to the body 32. Also attached to body 32 is a loop 54, which provides an attachment point for a fishing line 56. Hooks 44, 46 and loop 54 are preferably attached to body 32 by small rings. For this purpose, and for increased strength, the body 32 can include at least one wire which is thicker and stronger than the other wires, to which the hooks and loop are attached. However, any suitable method of attachment can be used.

In FIG. 2, the lure 30 is shown as having the shape of a minnow and includes a tail 48 attached to the closed end of the body 32 and a head 50 attached to the lid 36 and a dorsal fin 52. The use of features such as tail 48, head 50 and fin 52 can be adapted to any desired appearance. If constructed of suitable material, tail 48, head 50, and fin 52 can be used to provide for a certain degree of flotation of the lure 30. Alternatively, a hollow bladder could be placed inside or otherwise attached to the body 32 to provide for flotation.

Bait 34 is placed in lure 30 as follows. The angler opens the lure 30 by disengaging latching portions 40, 42 and pivots lid 36 about hinge 38. Once the cavity of body 32 is sufficiently exposed, the angler places bait 34, for example a grasshopper or other insect, within the cavity. The angler then pivots lid 36 back up against body 32 and engages latching portions 40, 42. The lure 30 is then ready for use.

Figures 3A, 3B:
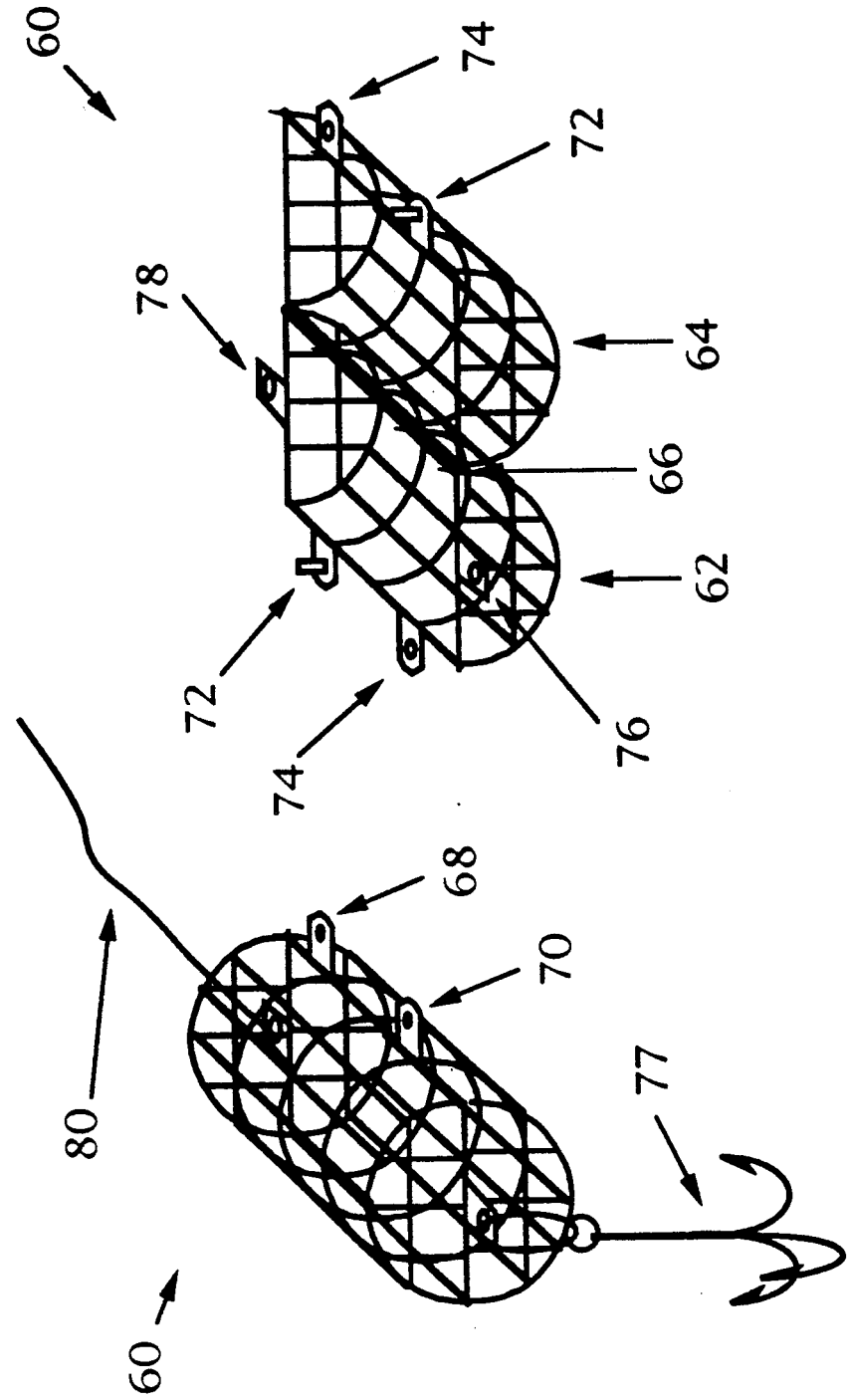
FIG. 3A is a perspective view of a third embodiment of a cage lure of the present invention in a closed position.
FIG. 3B is a perspective view of the embodiment shown in FIG. 3A in an open position.

FIGS. 3A and 3B show a further embodiment of the present invention. Lure 60, which is shown in a closed position in FIG. 3A and an open position in FIG. 3B, comprises two half cylindrical portions 62 and 64. The portions 62, 64 are joined together by a hinge 66. The half cylindrical portions 62, 64 are joined together such that they are able to form a full closed cylinder when one portion is placed on top of the other. A latching mechanism is provided so as to firmly hold the portions 62, 64 together when in a closed position. Two latches 68, 70 are used, each of which comprises a male portion 72 and a female portion 74. A loop 76 is provided for attachment of a hook 77, and a loop 78 is provided for attaching the lure 60 to a fishing line 80. The lure 60 is preferably moulded from a suitable type of plastic, rubber or other suitable material, and the shape shown is adapted for moulding in a simple two part mould, with the hinge 66 comprising three strips as live hinges. With this method of construction, the hinge 66, the latches 68, 70 and the loops 76, 78 can be formed integral with the lure 60. This results in a inexpensive and easily manufactured lure.

Figure 4:
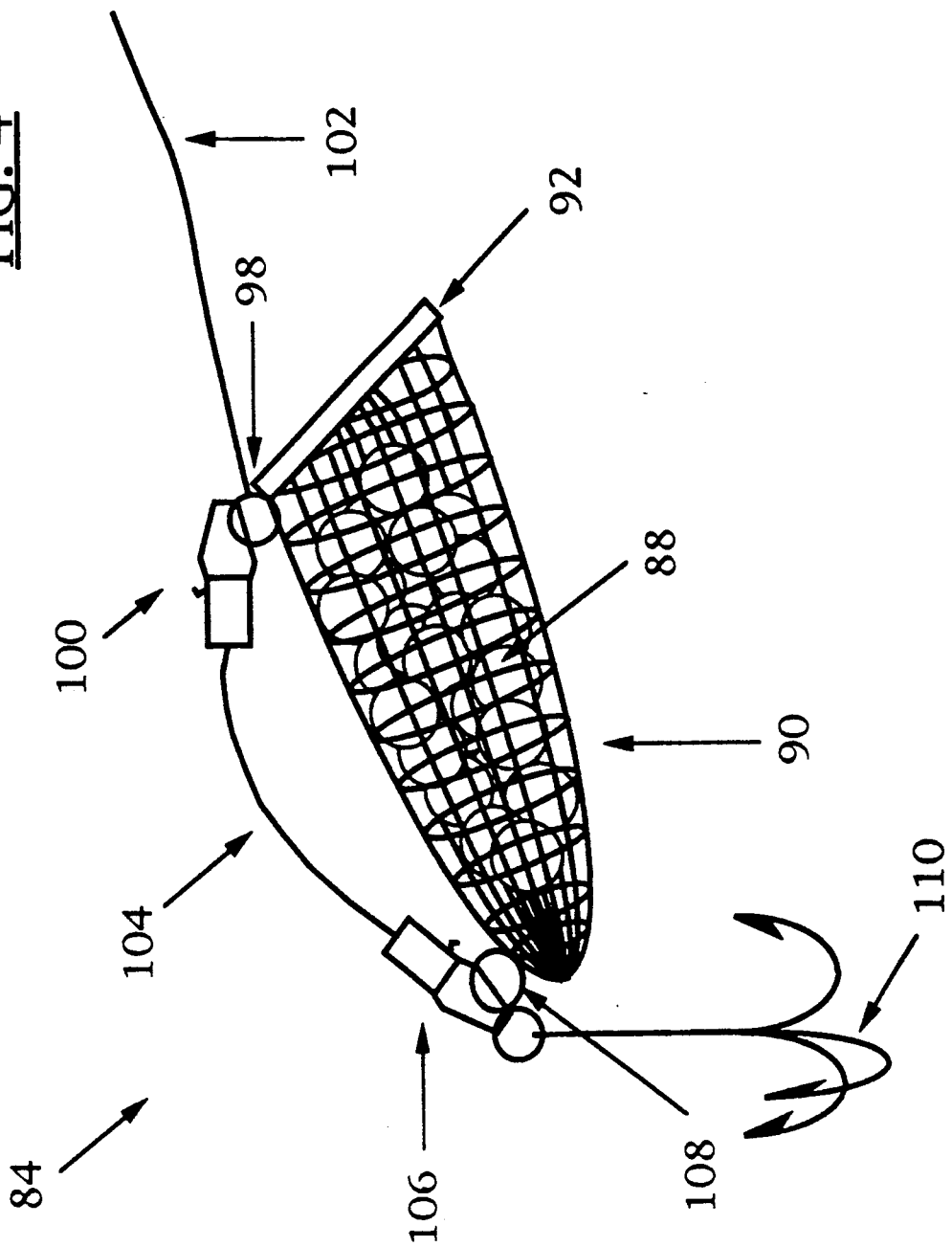
FIG. 4 is a perspective view of a bait bag according to the present invention.

FIG. 4 shows a further embodiment of the present invention, in which the lure of FIG. 1 is attached to a leader for greater strength. In FIG. 4, lure 84 comprises a meshed bag 90 and a spring 92, as described above. The bait 88 shown in FIG. 4 is roe; however, it is to be understood that any type of natural or man-made bait can be placed within the cavity of the bag 90.

In order that the lure 84 be as strong as possible, the bag 90 is not attached directly to a fishing line, but rather a metal leader 104 is used for this purpose. In the embodiment shown in FIG. 4, the spring 92 of the bag 90 has integral therewith a loop 98 through which a spring clip 100 is attached. A fishing line 102 is also attached to the openable portion of spring clip 100.

The clip 100 is fixedly attached to the metal leader 104 which has at its other end a spring clip 106 fixedly attached thereto. The spring clips 100, 106 provide openable attachment rings for the leader 104. The bag 90 is connected to spring clip 106 by means of a loop 108. Also attached to spring clip 106 is a hook 110. By using this arrangement, any stresses placed on the lure 84 by, for example, a fish becoming embedded on hook 110, are transmitted through the spring clip and leader portion of lure 84 to fishing line 102 and not through the bag 90. This allows the bag 90 to be constructed of light weight materials, such as nylon line. The bag 90 could be manufactured inexpensively, and treated either as a replaceable or as a disposable item.

The bag 90 could thus be a substitute for the known technique of using a patch of nylon stocking or pantyhose to form a bag to contain bait such as roe. This known technique is time consuming, requires considerable practice and manual dexterity and such a patch cannot be reliably attached to a hook.

Figure 5:
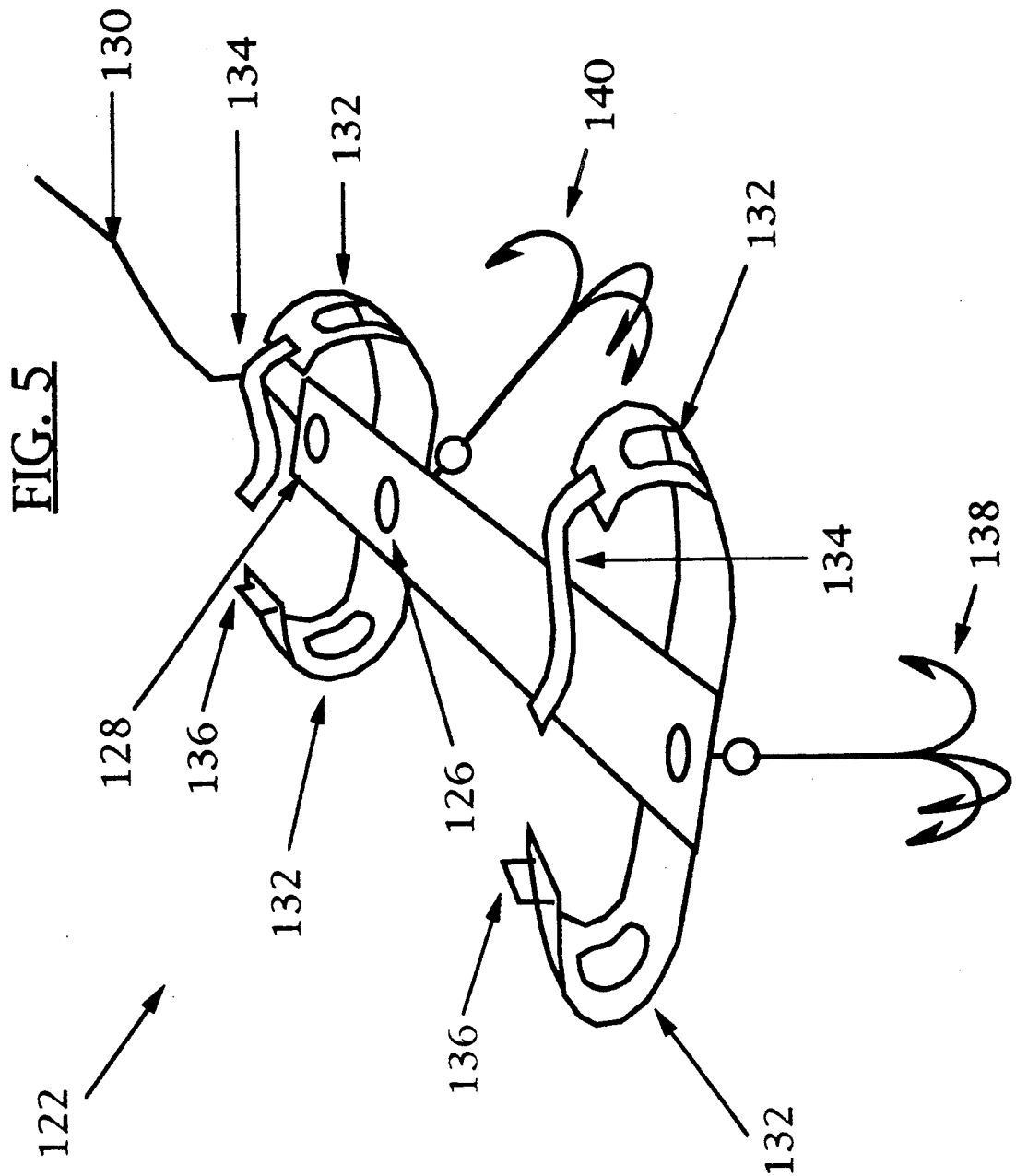
FIG. 5 is a perspective view of the frog harness of the present invention.

FIG. 5 shows a still further embodiment of the present invention which is specifically adapted for the use of frogs as bait. The frog lure 120 consists of a front harness portion 122 and a rear harness portion 124 connected by means of a transverse portion 126. The front harness portion 122, the rear harness portion 124 and the transverse portion 126 are preferably constructed from a sturdy waterproof material such as a nylon weave or a waterproofed canvas. The front harness portion 122 and the rear harness portion 124 are both elongate in shape, having a length much greater than their width. The transverse portion 126 is similarly shaped. One end of the transverse portion 126 is attached to the rear harness portion 124 proximate the centre of the rear harness portion 124. The front harness portion 122 is similarly attached to the transverse portion 126 proximate the other end of the transverse portion 126. Preferably, the front harness portion 122 is attached near but not at the end of the transverse portion 126, leaving sufficient space for the placement of an aperture 128 in the transverse portion 126 in front of the front harness portion 122. Aperture 128 provides an attachment point for a fishing line 130. The front harness portion 122 and the rear harness portion 124 are preferably attached to the transverse portion 126 using rivets; however, it is to be appreciated that any method suitable for the materials chosen may be used.

Both the front harness portion 122 and the rear harness portion 124 have two openings 132, each of the openings of each portion being located on either side of the transverse portion 126. The openings 132 are of a size, configuration and spacing such that the front and rear legs of the frog being used as bait can fit through the openings 132 on the front harness portion 122 and on the rear harness portion 124, respectively. Both the front harness portion 122 and the rear harness portion 124 include attached to one end of each of the respective portions a strap 134 which is adapted to releasably engage a loop 136 attached to the other end of the respective portions. Preferably, strap 134 is of a hook-and-loop material, such as Velcro (trade mark).

In the embodiment shown in FIG. 5, lure 120 includes two hooks 138 and 140. The hooks 138 and 140 are preferably attached to the rivets used to attach the rear harness portion 124 and the front harness portion 122 to the transverse portion 126.

The lure 120 is used as follows. The fisherman obtains a frog of desired size and configuration in any known manner. The fisherman then puts the front legs of the frog through the openings 132 in the front harness portion 122 and the rear legs of the frog through the openings 132 in the rear harness portion 124. The fisherman then threads straps 134 through loops 136 and back onto themselves. In this manner, the frog is firmly attached to the lure 120 and the lure is ready for use.

While several of the embodiments of the present invention that have been described in detail above utilize a body or bag of a meshed construction, it is to be understood that any other construction, such as perforations or louvres, that will allow the bait to be in contact with the water are also suitable.

It will be appreciated by those skilled in the art that lures as described above may be constructed in a variety of shapes, configurations and colours. While it is preferred that the body of the lure be transparent, in order to allow the bait to be clearly visible within the lure, it may be desired in certain circumstances to paint the lure or have the body of the lure constructed from coloured material. It will be appreciated that lures of the present invention can be of a variety of shapes, depending on the desired external appearance of the lure and the intended type of bait. For example, if it is desired to use insects such as crickets or grasshoppers, the lure can be a long, relatively thin shape whereas if other types of insects are the intended bait, the lure may be short and relatively squat. Such insects often make good bait, but due to their soft body tissue are extremely difficult to retain on a hook. Similarly, it will be appreciated that protrusions or bumps may be incorporated into the lure to provide a desired appearance or to impart a desired movement to the lure.

Different embodiments of the invention shown in the first four figures have numerous advantages over conventional bait attachment techniques. The cage lure is non-invasive, so that when live bait is used, there is no need to puncture or otherwise mutilate the body of the bait. A standard fishing practice requires the bait, for example a small animal, insect or fish, to be impaled on the hook. This has the disadvantage that the bait is either killed immediately or quickly. Dead bait is not nearly so attractive to fish, it does not move to attract them, and cannot emit the distress signals that often attract game fish to their regular prey. It also weakens the tissue of the bait, particularly where it is not possible to place a hook through part of the skeleton of the bait. This could lead to the bait falling off relatively quickly. This can happen in the water, and a fisherman can find that, unknowingly, he or she has been sitting for some time with an unbaited hook.

In contrast, the cage lure of the present invention does not require the bait to be damaged. In the case of live bait, particularly bait which normally lives in the water, the bait, such as small fish or frogs, can remain alive for an extended period of time. Further, as the bait is caged, in many cases, the captive insect or animal will emit distress signals. Many game fish can detect the frequencies of various vibrations or sounds emitted by their prey when in distress. Further, the actions of the prey in trying to escape from the cage may again cause distress signal that will attract the intended game fish.

The cage lure concept enables a wide variety of bait types to be used. Where bait is attached directly to the hook, the bait has to be, in effect, structurally sound enough, even after immersion in water for long periods, to remain on the hook. Despite the fact that fishing is an old sport, this is not the case with many types of bait used. With the cage lure of the present invention, fish eggs can be placed in the cage lure. A technique sometimes used currently is to wrap fish eggs in a fragment of nylon stockings or the like, but, as noted, this is difficult, time consuming and not reliable if then attached directly to the hook. Chemically scented baits or pellets and sponges soaked with bait material can also be reliably contained within the cage lure. With the cage lure all possible scent will be transmitted to the game fish. Scent from the bait can readily pass through the holes of the cage body. As noted, the distress signals given off by live bait, both vibrations transmitted through the water and visual distress signals, can be transmitted through the cage lure. Where it is expected that visual stimulation will be a major factor in attracting the desired game fish, the cage lure can be provided with appropriately large size mesh and fine threads to maximize this effect, consistent with retaining the bait.

It will also be apparent that the openings in the cage lure enable the angler to readily check the status of the bait. Further, the secure containment of the bait enables it to be reused many times, until its scent, etc. becomes exhausted.

For some types of fishing, it may be desirable to have the cage lure float. To this end, the cage itself can be made buoyant, either by making it from buoyant material, or by providing hollow or otherwise buoyant compartments or chambers in the cage lure. For example, in the embodiment shown in FIG. 2, the head, tail and fin could be made hollow. Alternatively, a long, thin bladder can be placed on the top or bottom of, or otherwise attached to, the cage lure to provide flotation. It will be appreciated that the amount of flotation may be controlled by using different flotation inserts. This leads to greater flexibility, as the recommended depth of fishing depends on the type of game being sought.

As mentioned, a variety of bait can be used. Additional baits include organic material such as pork rind, chum or left over bits of meat.

While the various embodiments of the present invention which are described above use bait such as roe, insects or minnows, it will be appreciated that the cavity of lures according to the present invention are also suited for the use of devices such as rattlers, which make noise and vibration when pulled through water, and devices which are designed to reflect light when pulled through the water. Such an insert could be designed to spin on an axis, like a turbine. This would produce bright, changing flashes of colour. The insert could be patterned, to provide an attractive interaction with the pattern of the surrounding cage lure; alternatively, the cage itself could be made from transparent line material.

There is no limit to the number of different variations in the appearance of the cage lure. As FIG. 2 shows, the lure could be manufactured with colourful markings, painted to simulate a minnow. However, it must be provided with sufficient holes, louvres or other openings, to permit the scent of the bait to escape. Where the visual appearance of a minnow, or other prey, is desired, it is preferred to achieve this appearance by using a coloured insert, within a transparent body or cage with large openings and narrow bars. However, for some purposes, a lure that appears to be substantially a solid minnow or other prey on the exterior may be desired.

For the purpose of simulating bait, feathers and other body parts could be simulated. Although FIG. 2 shows a simulated minnow profile, the cage lure could be shaped like a frog, insect or other prey attractive to a desired species of fish.

An important concept associated with this invention, as noted, is the realization that it is not necessary for the bait to be impaled directly on the hook, but simply that the bait be located closely adjacent the hook, so that a desired target fish will attempt to swallow both the hook, cage lure and enclosed bait together. For this reason, it may prove desirable to enclose the hook within the cage lure. For this purpose, the bait could first be inserted into the cage lure, followed by one or more hooks. The cage lure itself would then be of flexible and collapsible construction, as shown in FIGS. 1 or 4. When swallowed by a fish or simply grasped in the fish's mouth, the hooks would penetrate through the walls of the cage lure and into the fish's mouth or jaws, hooking the fish firmly to the line. This has the effect of closely associating the bait with the hook, which not relying on the hook itself to retain the bait in position.

While the present invention has been described with reference to certain preferred embodiments, it will be appreciated that various modifications and variations may be made to the preferred embodiments without departing from the scope of the invention as disclosed and defined in the appended claims.

I claim:

1. A cage lure for attachment to a fishing hook and a fishing line, and for use in containing bait, comprising:
   (a) a bait enclosure bag having a flexible meshed construction sufficiently perforate to enable water to pass therethrough and contact the bait, said bait enclosure bag having a closed end and an open end opposite said closed end;
   (b) a closure means for closing said open end, said closure means comprising a dual spring which is biased into a closed position, but which can be resiliently deflected to an open position;
   (c) a leader having openable attachment rings, said rings adapted for attachment, in use, to the fishing line and the fishing hook; and
   (d) means for releasably attaching said bait enclosure bag to said leader, said attachment means comprising at least two loops, said loops attached to said openable attachment rings.

2. A cage lure as claimed in claim 1 wherein said spring is constructed of one of spring steel and plastic, and includes an aperture for attachment to a fishing lure and a fishing hook.

3. A cage lure as claimed in claim 1, wherein the loops are adapted for connection between a fishing line and a fishing hook, with the bait enclosure being as strong as a fishing line intended for connection thereto.

4. A cage lure as claimed in claim 1, 2 or 3 wherein the bait enclosure simulates the appearance of a fish and includes simulated fins.

5. A cage lure as claimed in claim 1, 2 or 3 wherein the bait enclosure is buoyant.

6. A cage lure as claimed in claim 1, 2 or 3, in combination with a fishing hook and a fishing line attached thereto.

* * * * *